No. 847,027. PATENTED MAR. 12, 1907.
H. G. SLINGLUFF.
GLASS DRAWING AND BLOWING APPARATUS.
APPLICATION FILED JAN. 6, 1906.
2 SHEETS—SHEET 1.
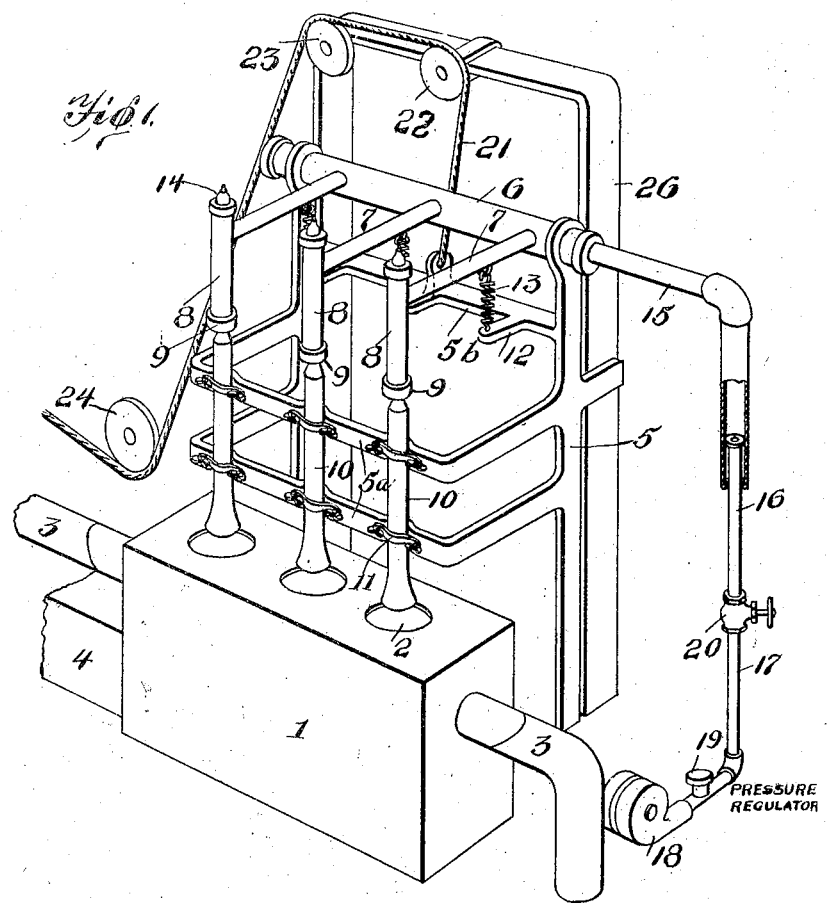
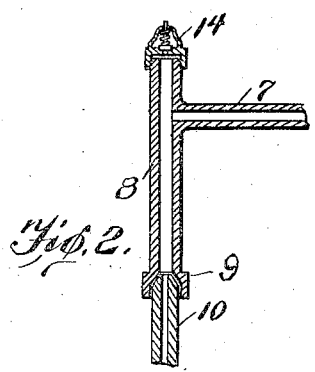
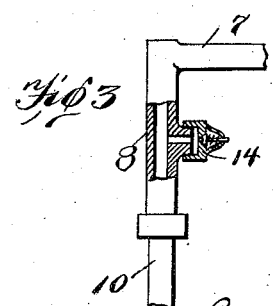

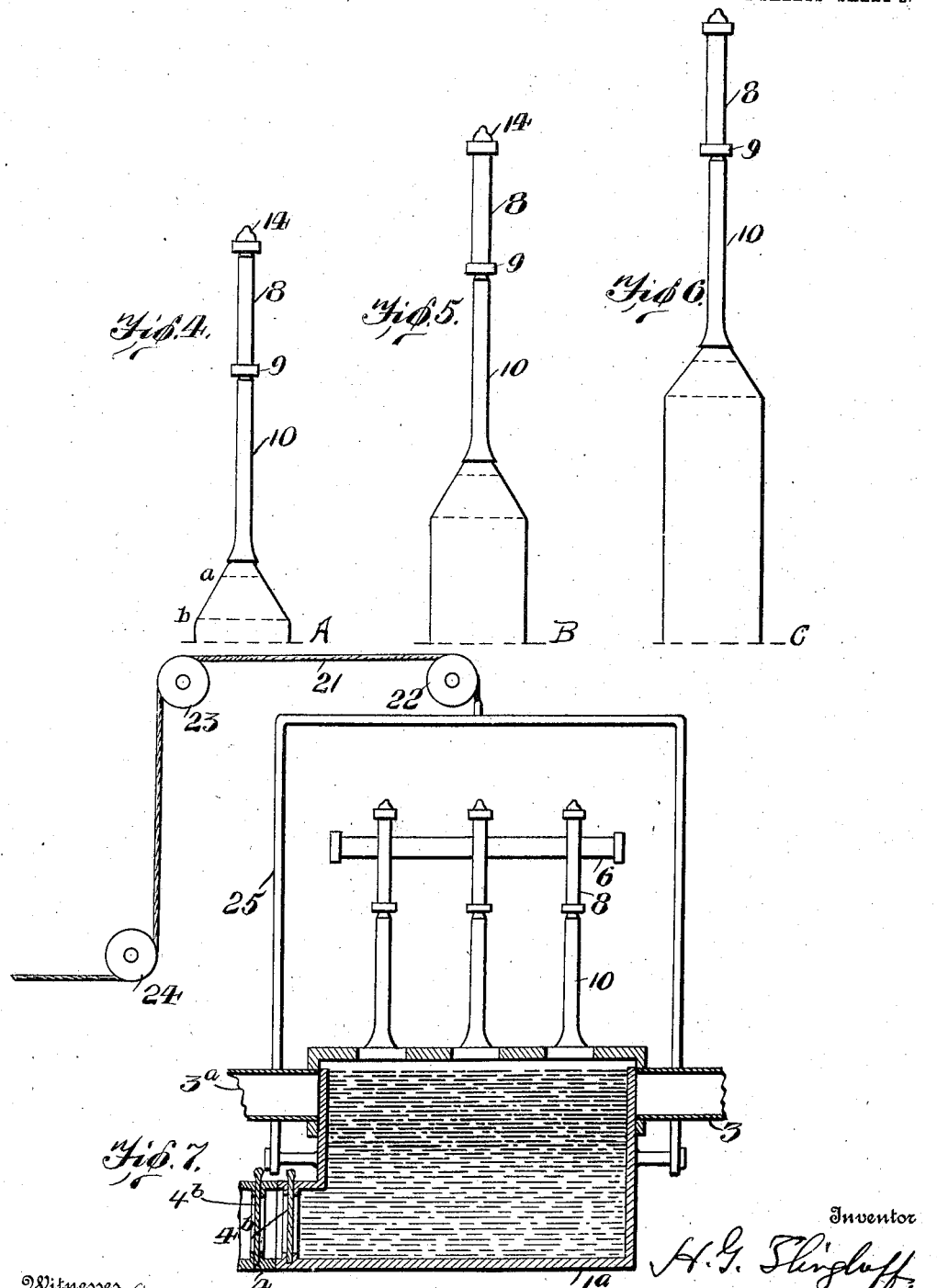

UNITED STATES PATENT OFFICE.

HARRY G. SLINGLUFF, OF HARTFORD CITY, INDIANA, ASSIGNOR TO GEORGE T. OLIVER, OF ALLEGHENY COUNTY, PENNSYLVANIA

GLASS DRAWING AND BLOWING APPARATUS.

No. 847,027.  Specification of Letters Patent.  Patented March 12, 1907.

Application filed January 6, 1906. Serial No. 294,927.

*To all whom it may concern:*

Be it known that I, HARRY G. SLINGLUFF, a citizen of the United States, and a resident of Hartford City, county of Blackford, State of Indiana, have invented certain new and useful Improvements in Glass Drawing and Blowing Apparatus, of which the following is a specification.

My invention relates to glass drawing and blowing apparatus; and my object is to provide an apparatus of this character by the use of which a single operator may draw any desired number of cylinders or rollers of glass at one operation, whereby a material saving in the cost of labor and production in the manufacture of glass products may be effected.

With this object in view my invention consists, broadly, in the provision, in connection with a drawing kiln or tank, of a plurality of drawing and blowing tools or devices with means for distributing air at the same pressure to all of said tools as the same are operated to draw cylinders or rollers of glass from said kiln, and it further consists in the novel construction and details thereof, as hereinafter described, with reference to the accompanying drawings, and more particularly pointed out in the claims.

In the drawings, Figure 1 is a perspective view of a glass-drawing kiln or tank with my invention applied thereto. Fig. 2 is a detail in section of one of the drawing and blowing tools and supply-pipe therefor. Fig. 3 is a detail view of a modified form. Figs. 4, 5, and 6 are diagrammatic views showing the different steps in the drawing and blowing operation; said Fig. 7 is an elevation, partly in section, of a modified form.

Referring to the drawings, in which the same reference characters relate to the same or corresponding parts in all the views, I have shown my invention as applied to a glass-drawing tank of the form disclosed in my prior patent, No. 804,775, dated November 14, 1905, though it may obviously be applied to any other form of drawing kiln or tank without material departure from the spirit and scope of my invention.

The numeral 1 indicates the drawing tank or kiln provided with a plurality of drawing-openings 3, to which tank glass is admitted from the melting tank or furnace (not shown) through a pipe or conduit 4 and in which tank above the surface of the glass the products of combustion are circulated through the pipe or conduit 3, as in said prior patented structure In a suitable frame 5, comprising vertical bars 5 and cross-bars 5$^a$ and 5$^b$, an air-supply pipe or conduit 6 is mounted preferably in trunnion-bearings, as shown. From this pipe extends a series or plurality of horizontal branches 7, communicating with similar vertical branches 8 at right angles thereto, having at their lower ends sockets 9, adapted to receive the tapered ends of ordinary glass-drawing tools 10, removably clamped to cross-bars 5$^a$ of said frame by suitable clamping devices 11, the heavy ends of which tools are adapted to enter the several drawing-openings 2 of the drawing kiln or tank. The joint between the drawing-tools and the vertical branches 8 is preferably packed, as desired, with any suitable packing to make an air-tight joint, and to further insure such a joint between the two said elements I provide springs 13, connecting the branches 7 with lugs 12, extending from one of the cross-bars 5$^a$ of the frame 5. Each of said branches above the drawing-tools is provided with a relief or pop valve 14 of any suitable construction having a sensitive action and adapted to be set for any predetermined pressure, so that exactly the same pressure may be maintained in each of the drawing-tools and the air-pressure-distributing devices, as will be readily understood.

The supply of air under pressure is furnished to the air pipe or conduit 6 from any suitable system or source of air-pressure, as from a fan or blower 18, communicating with said pipe 6 through pipes 17, 16, and 15.

To raise and lower the frame 5 and the drawing and blowing tools 10, rigidly held thereby, any suitable elevating mechanism may be employed, a convenient form being shown in the drawings, wherein a cable 21, connected to the frame 5, which is slidably mounted upon fixed standards 26, passes around suitable pulleys 22, 23, and 24 and thence to any suitable hoisting-drum operated by hand or power actuated means, as desired. To compensate for the relative movements of the pipe 6 and its branch 15 with respect to the main supply-pipe leading from the fan or blower 18, any suitable telescopic joint between the pipes 15 and 16 may be used, as indicated in the drawings, such joint being provided with suitable packing to insure an air-tight connection between the two, if necessary.

Located in the supply-pipe 17 is a pressure-regulator 19, which is adjusted for any predetermined pressure to be delivered to the drawing-tools, and a valve 20 is interposed in the pipe 17 between the regulator 19 and the drawing-tools for governing the amount and pressure of air delivered to the distributing-pipe 6. By the manipulation of this single valve the operator is enabled to control the drawing operations for any number of such drawing-tools, and thereby control the drawing and blowing of any desired number of cylinders or rollers.

Instead of locating the pop or relief valve 8 at the top of the pipes 8 the latter may extend downwardly from the branches 7 and said relief or pop valves located in the sides thereof, as shown in Fig. 3.

Should it be desired to move the drawing-kiln relatively to the drawing-tool structure, the said kiln may be constructed upon a suitable elevator or provided with elevating mechanism of any suitable kind—as, for example, that shown in Fig. 7, wherein the drawing-tank 1$^a$ is provided with suitable lifting-frame 25, to which is attached the cable 21, passing around the pulleys 22, 23, and 24, while the tool structure is rigidly fixed in one position. The kiln may thus be lowered, increasing the space between it and the tools, thus producing the same result as before described. In this construction the conduit 4 is provided with a suitable damper 4$^b$ for closing the same, and a similar damper in the section of said conduit connected to the melting furnace or tank is provided for closing the same. Circulating-pipes 3 are similarly provided with dampers 3$^a$, as in the prior patent.

With the construction as described the operation of the device is as follows: The drawing-tools having been rigidly clamped to the frame, with their tapered ends firmly seated in the sockets 9 of the pipes 8 and the relief or pop valves set for the given pressure, the pressure-regulator being similarly set, the frame 5 is lowered until the heavy ends of the drawing-tools pass through the openings 2 into the molten glass in the drawing tank or kiln, whereupon the operator turns the valve 20, admitting the desired pressure to the distributing-pipe 6, whence it passes into the several branches 8 and thence through the drawing-tools forming the cap A, Fig. 4. The frame is then raised at the desired drawing speed, all of the tools moving at exactly the same drawing speed. The pressure of air admitted through the tools will blow the cap to the diameter indicated, for example, in Fig. 4, and as the same pressure exactly is maintained in each of the drawing-tools the cylinders will all be blown and drawn with exactly the same diameter. As the regulator 19 is adjusted to furnish the air of sufficient volume and pressure to give the cylinders the desired diameter at the cap A, (see Figs. 4, 5, and 6,) the relief or pop valves 14 will maintain exactly the same pressure in each of the drawing-tools, and as a result each of the cylinders will be blown with exactly the same diameter throughout, the middle portion B, Fig. 5, and the end portion C, Fig. 8, being formed as the drawing-tool is raised from the kiln or tank under exactly the same conditions of pressure and volume. It will of course be understood that when a roller or cylinder of different diameter is desired the regulator 19 is set to the required pressure for producing such desired diameter under the same conditions of working, and if the pop or relief valves are used they are correspondingly set, as before indicated.

It should be noted that in operating the valve 20 the entire pressure is not transmitted immediately to and through the blowing-tools, and as a result I am enabled to form the cap of the shape of a truncated cone $a\,b$, Fig. 4. Such a formation of cap is more advantageous than that made prior to my invention, both in hand-blowing and machine-made cylinders, whereby the cap formed has a spherical contour and is slow and tedious in its formation, whereas under my process the cap can be made on the run, and as the drawing or elevating mechanism is put in operation the air controlled by the operating-valve 20 gains pressure from the point $a$, increasing gradually until it reaches the desired and regulated pressure at $b$, from which point the pressure is controlled and maintained by the relief and pressure valves, as above described.

While I have referred to air-pressure as the blowing means, it will be understood, of course, that in the specification and claims this term is intended to and does include any available gaseous pressure suited for the purpose, and it is to be understood, further, that various changes may be made in the details of construction within wide limits without departing from the broad scope of my invention as set forth herein and in the claims hereto appended, and it is further obvious that the regulating means—as, for example, the pressure-regulator—may operate in connection with either one or any number of drawing and blowing tools to secure and maintain the uniform pressure therein.

I claim as my invention—

1. In a glass drawing and blowing apparatus, the combination with the glass-tank, of a plurality of drawing and blowing tools, means for effecting relative movement of the tools and tank to effect the simultaneous drawing of a plurality of cylinders of glass, a conduit for distributing air under pressure to the series of tools, and a pressure-regulator coöperating therewith for regulating the pressure of the air supplied to said tools, said regulator being constructed to maintain the air-pressure substantially constant within a glass cylinder while the same is being drawn, substantially as described.

2. In a glass drawing and blowing apparatus, the combination with a glass-tank, of a plurality of drawing and blowing tools, means for effecting relative movement of the tools and tank, means for distributing air under pressure to the series of tools, and means connected with each tool for maintaining the air in all the tools at the same pressure, substantially as described.

3. In a glass drawing and blowing apparatus, the combination with a glass-tank, of a plurality of drawing and blowing tools, means for effecting relative movement of the tools and tank, means for distributing air under pressure to the series of tools, a pressure-regulator for regulating the pressure of air supplied to the tools, and means connected with each of the tools for maintaining the same air-pressure therein, substantially as described.

4. In a glass drawing and blowing apparatus, the combination with a glass-tank, of a plurality of drawing and blowing tools, movable relatively to said tank, means for distributing air under pressure to said tools, and a pop or relief valve set for the same pressure connected with each of said tools, substantially as described.

5. In a glass drawing and blowing apparatus, the combination with a glass tank, of a plurality of drawing and blowing tools, movable relatively to said tank, means for distributing air under pressure to said tools, a pop or relief valve set for the same pressure communicating with each of said tools, and a pressure-regulator for regulating the pressure of air distributed to said tools, substantially as described.

6. In a glass drawing and blowing apparatus, the combination with a glass-drawing tank, of a plurality of drawing and blowing tools, a frame upon which said tools are fixedly mounted, and movable relatively to the tank, an air-pressure supply communicating with each of the tools, and a pop or relief valve set for a given pressure controlling an outlet from each of said tools, substantially as described.

7. In a glass drawing and blowing apparatus, the combination with a glass-drawing tank, of a plurality of drawing and blowing tools, a frame upon which said tools are fixedly mounted, and movable relatively to the tank, an air-pressure supply communicating with each of the tools, a pop or relief valve set for a given pressure controlling an outlet from each of said tools, and a pressure-regulator in the air-supply system controlling the pressure of air distributed to the tools, substantially as described.

8. In a glass drawing and blowing apparatus, the combination with a glass-drawing tank having a plurality of drawing-openings, a plurality of drawing and blowing tools movable into and out of said openings, a frame upon which said tools are mounted, means for moving said frame away from and toward the tank, an air-pressure-supply pipe on said frame communicating with each of said tools, an air-pressure-supply system communicating with said supply-pipe, and means for maintaining the air at each tool at a substantially constant pressure, substantially as described.

9. In a glass drawing and blowing apparatus, the combination with a glass-drawing tank having a plurality of drawing-openings, a plurality of drawing and blowing tools movable into and out of said openings, a frame upon which said tools are mounted, means for moving said frame away from and toward the tank to effect the simultaneous drawing of a plurality of glass-cylinders, an air-pressure-supply pipe on said frame, communicating with each of said tools, an air-pressure-supply system communicating with said supply-pipe, and a pressure-regulator in said system for maintaining the same air-pressure in said supply-pipe and tools, substantially as described.

10. In a glass drawing and blowing apparatus, the combination with a glass-drawing tank having a plurality of drawing-openings, a plurality of drawing and blowing tools movable into and out of said openings, a frame upon which said tools are mounted, means for moving said frame away from and toward the tank, an air-pressure-supply pipe on said frame, communicating with each of said tools, an air-pressure-supply system communicating with said supply-pipe, a pressure-regulator in said system for controlling the pressure of air distributed to the said supply-pipe and tools, and a pop or relief valve set for the same pressure coöperating with each drawing-tool, substantially as described.

11. In a glass drawing and blowing apparatus, the combination with a glass-drawing tank, of a plurality of openings through which glass may be drawn, a frame above said tank, a plurality of drawing and blowing tools mounted in said frame, an air-pressure-supply pipe on said frame having branches communicating with the drawing-tools, means for moving said frame toward and from the tank, an air-pressure system having a main supply-pipe communicating with the supply-pipe on the frame, and a pressure-regulator in said pipe for controlling the pressure of air distributed to the supply-pipe, substantially as described.

12. In a glass drawing and blowing apparatus, the combination with a glass-drawing tank, of a plurality of openings through which glass may be drawn, a frame above said tank, a plurality of drawing and blowing tools mounted in said frame, an air-pressure-supply pipe on said frame having branches communicating with the drawing-tools, means for moving said frame toward and from the tank, an air-pressure system having a main supply-pipe communicating with the supply-pipe on the frame, a pressure-regulator in said pipe for controlling the pressure of air distributed to the supply-pipe, and a valve in said main supply-pipe for opening and closing communication between said pipe and the supply-pipe on the frame, substantially as described.

13. In a glass drawing and blowing apparatus, the combination with a glass-drawing tank having a plurality of openings, a plurality of drawing and blowing tools, a reciprocating frame on which said tools are removably mounted, means for reciprocating the said frame with reference to the tank, an air-pressure-supply pipe on the frame having branches adapted to communicate with the said tools, pressure-relief valves in said branches adapted to maintain the same air-pressure in all of said branches and the tools connected thereto, a main air-pressure-supply pipe having a telescopic connection with the said air-pressure supply on the frame, and means for supplying air thereto under pressure, substantially as described.

14. In a glass drawing and blowing apparatus, the combination with a glass-drawing tank having a plurality of openings, a plurality of drawing and blowing tools, a reciprocating frame on which said tools are removably mounted, means for reciprocating the said frame with reference to the tank, an air-pressure-supply pipe on the frame having branches adapted to communicate with the said tools, pressure-relief valves in said branches adapted to maintain the same air-pressure in all of said branches and the tools connected thereto, a main air-pressure-supply pipe having a telescopic connection with the said air-pressure supply on the frame, means for supplying air thereto under pressure, and a valve in said main air-pressure-supply pipe for controlling the passage of air therethrough, substantially as described.

15. In a glass drawing and blowing apparatus, the combination with a glass-drawing tank having a plurality of openings, a plurality of drawing and blowing tools, a reciprocating frame on which said tools are removably mounted, means for reciprocating the said frame with reference to the tank, an air-pressure-supply pipe on the frame having branches adapted to communicate with the said tools, pressure-relief valves on said branches adapted to maintain the same air-pressure in all of said branches and the tools connected thereby, a main air-pressure-supply pipe having a telescopic connection with the said air-pressure supply on the frame, means for supplying air thereto under pressure, a valve in said main air-pressure-supply pipe for controlling the passage of air therethrough, and a pressure-regulator between said valve and the source of air-pressure for governing the pressure of air delivered to said valve, substantially as described.

16. In a glass blowing and drawing apparatus, the combination with a glass-drawing tank or kiln, having a plurality of drawing-openings, a plurality of drawing and blowing tools coöperating therewith to draw and blow, conjointly and simultaneously, a plurality of cylinders or rollers of glass therefrom, and means for distributing air under the same pressure in all of said tools, and for maintaining said pressure constant within a cylinder while this is being drawn, substantially as described.

17. In a glass drawing and blowing apparatus, the combination with a glass-drawing tank or kiln, of a drawing device and a plurality of blowing devices coöperating with said tank to draw and blow a plurality of cylinders or rollers, simultaneously and conjointly, means controlled by a single valve for distributing air under pressure to all of said devices, and means for maintaining air under a pressure substantially constant in each of said drawing and blowing devices during the drawing operation, substantially as described.

In testimony whereof I have signed my name to this specification in the presence of two subscribing witnesses.

HARRY G. SLINGLUFF.

Witnesses:
SALLIE R. BALL,
E. L. BRAUN.